United States Patent [19]

Åkerberg

[11] Patent Number: 4,682,350
[45] Date of Patent: Jul. 21, 1987

[54] EQUIPMENT FOR WIRELESS TELEPHONE TRANSMISSION

[75] Inventor: Dag E. Åkerberg, Järfälla, Sweden

[73] Assignee: Telefonaktiebolaget LM Ericsson, Stockholm, Sweden

[21] Appl. No.: 850,222

[22] Filed: Apr. 10, 1986

Related U.S. Application Data

[63] Continuation of Ser. No. 598,353, Mar. 6, 1984, abandoned.

[30] Foreign Application Priority Data

Jul. 6, 1982 [SE] Sweden .............................. 8204187

[51] Int. Cl.⁴ ............................................ H04N 11/00
[52] U.S. Cl. ......................................... 379/61; 379/58
[58] Field of Search ................. 179/2 E, 2 EA, 2 EC; 370/29, 109; 381/34

[56] References Cited

U.S. PATENT DOCUMENTS

| | | | |
|---|---|---|---|
| 3,673,335 | 6/1972 | Joel, Jr. | 370/109 X |
| 3,827,052 | 7/1974 | Tanaka | 370/29 |
| 4,034,295 | 7/1977 | Kotezawa et al. | 370/29 |
| 4,268,722 | 5/1981 | Little et al. | 179/2 EB |
| 4,467,473 | 8/1984 | Arnon et al. | 370/100 |
| 4,525,835 | 6/1985 | Vance et al. | 370/29 |

Primary Examiner—Robert Lev
Attorney, Agent, or Firm—Roberts, Spiecens & Cohen

[57] ABSTRACT

A method of connecting audio information between a base telephone unit which is stationary and a portable unit associated therewith, the method involving dividing the communication time for audio information into first and second periods. During each first period, transmitting audio information from one of the units to the other over a radio channel and during each second period transmitting in reverse direction. The duration of the periods is a function of which transmitter is active at a given time.

7 Claims, 12 Drawing Figures

Audio signal to be transmitted
stationary transmitter 11
radio transmission
mobile receiver 25
audio signal as received Audio signal to be transmitted
mobile transmitter 24
radio transmission
stationary receiver 12
audio signal as received

NOTE:
THE "IN CLOCK" TO FIFO 63 IS CONTINUOUSLY SAMPLING (A/D 62) AND CLOCKING INTO FIFO 63, WHICH HAS OVERFLOW FUNCTION

THE CLOCK OUT OF FIFO 72 AND THE D/A 73 ARE ALSO CONTINUOUSLY WORKING.

EQUIPMENT FOR WIRELESS TELEPHONE TRANSMISSION

This is a continuation application of Ser. No. 598,353, filed Mar. 6, 1984, now abandoned.

FIELD OF INVENTION

The present invention relates to equipment for wireless telephone transmission.

BACKGROUND

There are a number of simple portable wireless telephones available on the market. The portable telephone coacts with a stationary unit situated in its vicinity, this unit being connected to a telephone line. A radio frequency is used for transmitting speech from the stationary to the portable unit, and for transmission in the opposite direction another radio frequency is used, a conversation normally being transmitted in full duplex. An installation with such portable telephones is described in Canadian Patent No 1197031.

The availability of radio frequencies is limited, however, and many of them will be engaged when each pair of telephones is to have two radio frequencies.

SUMMARY OF INVENTION

In accordance with the present invention there is only one radio call channel assigned to a pair of units comprising a fixed unit and a wireless handset. Telephone calls are transmitted in both directions on this single channel. The transmission is enabled by the channel being time-divided in short, cyclically recurring time intervals. Furthermore, all the wireless handsets or radio transmitters have a time compressor device and all receivers a time expander device.

In one embodiment of the invention the time compressor device is implemented for utilising only a small part of the divided time interval when there is no telephone signal to be sent, and a major portion of the time interval when there is a telephone signal to be sent. The available frequency space for transmission of the telephone signals is accordingly increased, as well as voice sound quality.

In its basic implementation the apparatus is provided with a radio transmitter adapted for sending digitalized voice signals, but in a development of the invention the transmitters are adapted for sending analogue voice signals, and in this case there is decreased demand on the signal frequency range. The radio receivers in the equipment are, to advantage, adapted for operating according to the homodyne principle, the frequency of the local oscillators then mainly being the same as the carrier frequency of the radio transmitters, since each transmitter in a pair of units is to send on the same radio speech channel.

BRIEF DESCRIPTION OF DRAWINGS

An example of equipment in accordance with the invention is described below with reference to the accompanying drawings in which.

DETAILED DESCRIPTION

Figure 1:
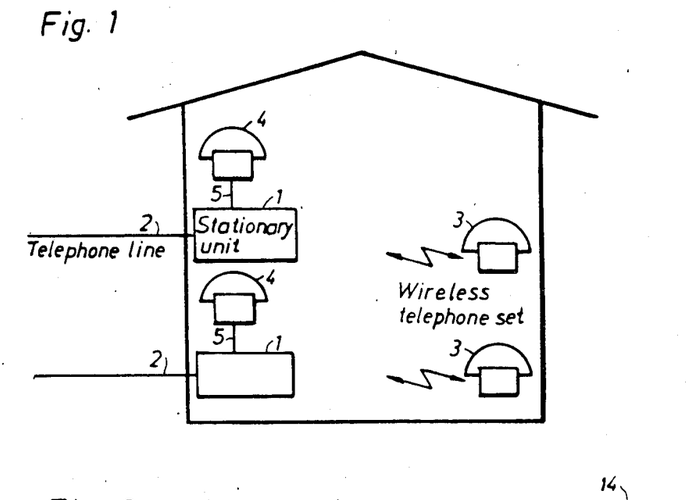
FIG. 1 is a block diagram of the units in a wireless telephone system.

In an example of equipment having wireless telephone units, as illustrated in FIG. 1, there are two sets of units, each with a stationary unit 1 connected to a telephone line 2, a wireless telephone unit 3 and a normal telephone unit 4 connected to the stationary unit 1 by a line 5. The enumerated units are preferably intended for being in the same house or office with there being a short distance between the stationary unit 1 and the associated wireless unit 3.

Figure 2:
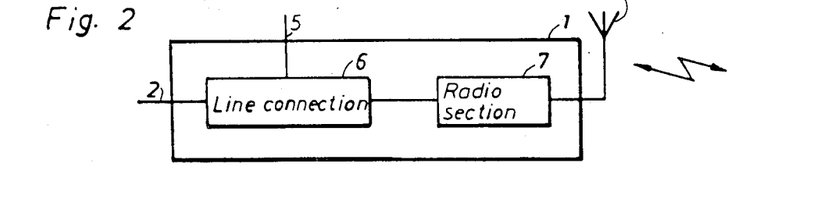
FIG. 2 is a block diagram of the stationary unit.

In the stationary unit 1, FIG. 2, there is included a line connection section 6 and a radio communication section 7, hereinafter called radio section for the sake of brevity.

The line connection section 6 contains components, which are not shown, namely a ringing signal detector, circuits for sending numbers, control logic and adaption circuits of normal implementation for telephony purposes, and which being well known do not need any detailed description in this text.

Seen from the line side, the equipment thus functions as an ordinary telephone with side apparatus.

Figure 3:
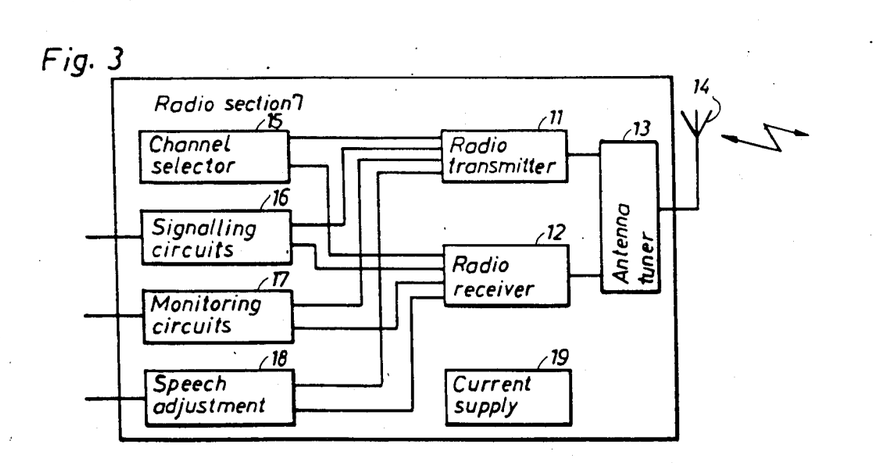
FIG. 3 is a block diagram of the radio communication section in the stationary unit.

The radio section 7, FIG. 3, includes a radio transmitter 11 and receiver 12 for speech and signalling, antenna tuner 13 and an antenna 14. The radio section also includes a channel selector 15 and logical circuits for signalling 16 and monitoring 17. A voice adaption section 18 and a current supply section 19 are also included.

Figure 4:
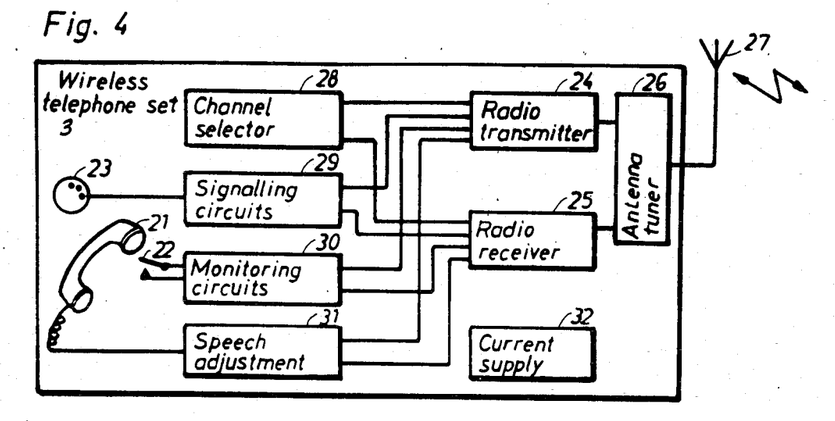
FIG. 4 is a block diagram of the portable unit.

The wireless telephone handset 3, FIG. 4, is portable and made such that, as far as using it is concerned, it functions as a normal telephone handset, although differing from one in shape. In an ordinary telephone handset there are included a microphone 21, a cradle contact 22 and a number selector 23. These are supplemented in the handset 3 by a radio transmitter 24, receiver 25, antenna tuner 26 and an antenna 27, as well as a channel selector 28 and logical circuits for signalling 29 and monitoring 30, a voice adaption or speech adjustment section 31 and a current supply section 32 with batteries included.

Figure 5:
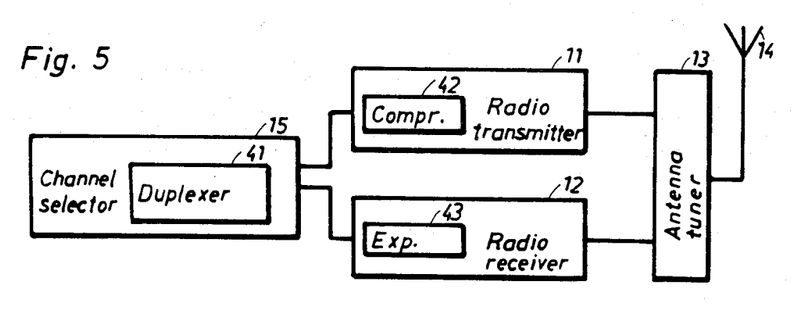
FIG. 5 is a block diagram of sub-units or sections in the stationary unit.
Figure 6:
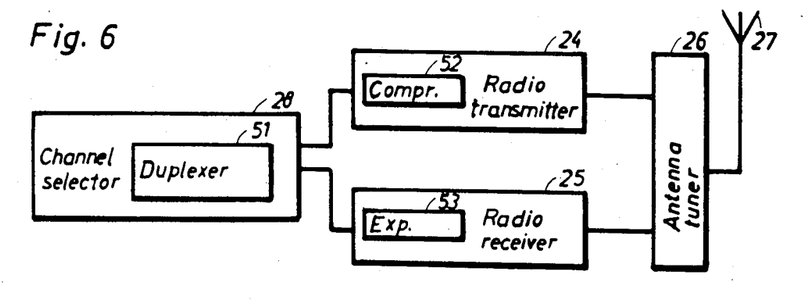
FIG. 6 is a block diagram of sub-units or sections in the portable unit.

The radio transmitters 11, 24 and receivers 12, 25 in the stationary and portable units (FIGS. 5 and 6 respectively are adapted for being switched between a plurality of channels with the aid of the associated channel selector 15 or 28. The channels include a signalling channel, to advantage but not necessarily common to all pairs of units, and an optional number of radio speech channels. The channel selectors are adapted for listening to each of the speech channels for determining whether it is engaged or unoccupied and for setting the transmitter on the unoccupied channel encountered first.

Equipment of the kind disclosed here is described in the parent application mentioned above.

In the exemplified equipment of the present invention, a radio speech channel consists of a selected frequency band with a bandwidth suitable for transmitting a call in one direction. It is customary for the frequency bands to be selected such that channel separation is 25 kHz. As will be seen from FIGS. 5 and 6, for a call in full duplex to be transmitted on a single speech channel, (i.e., such that both transmitters in a pair send on the same frequency), it is required that the channel selectors 15 and 16 are equipped with time-controlled transmitter-receiver switches 41 and 51 in the stationary unit 1 and the wireless handset 3, respectively. The switches are adapted for changing the transmission direction of the radio transmitter 11 and 24, respectively, with such short intervals in time (e.g., having a maximum of 100 ms) that they are unnoticable, and do not cause one party to start talking before the other has finished.

So that no part of the conversation will be lost, the radio transmitters 11 and 24 are furthermore provided with time compression means 42 and 52, respectively, adapted for storing speech signals during an interval when the associated transmitter is closed. When a transmitter is coupled in, it is adapted to send the stored speech signals during about half a time interval, thus with approximate double real time speed.

The radio receivers 12 and 25 are provided with time expansion means 43 and 53, respectively, which are adapted to store the received compressed speech signals when the receiver is switched in and, when it is closed and the associated transmitter is switched in, to feed out the speech signal at real time speed.

The described means enable conversation in full duplex on one radio channel, the bandwith of which is only dimensioned for transmission in one direction. The double utilization of a channel in this way has a certain effect on the quality of the transmission, which will be discussed below. The time sequence in transmission and reception is described in principle in the time chart in FIG. 7. The speech signals in the transmitter 11, uppermost in the diagram, are divided into time intervals, all with the length of T seconds. In the time compression means 42 the signals are compressed during the interval so that they can be sent during approximately T/2 seconds, and in this condition are received in the receiver 25. Compression in time is done by the signals at the beginning of the interval being delayed, in this case by T/2 seconds, while the signals at the end of the interval remain undelayed. In the time expansion means 53 in the receiver 25, the signals received during the time T/2 are expanded such that once again they take up the time T seconds, now by delaying the last signals in the interval, as will be seen from the chart. Transmission in the opposite direction from the transmitter 24 to the receiver 12 is shown in the lower part of the chart, and the description does not need to be repeated here.

Figure 7:
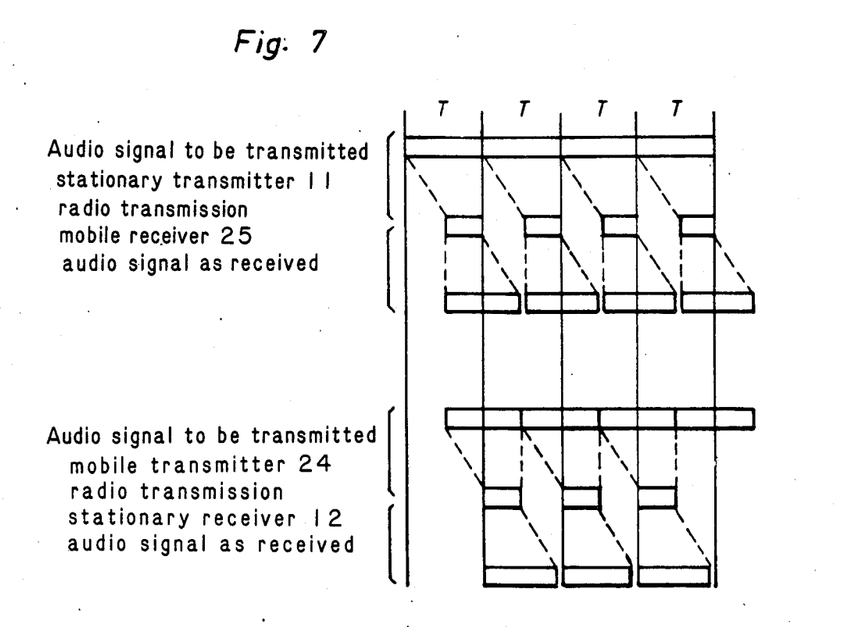
FIG. 7 is a time chart of time compression and time expansion.

It will be seen from the chart that the utilized single radio speech channel is alternatingly occupied with transmission in one or the other direction. For the transmission to take place alternatingly, the limits between the time intervals in both transmitters are displaced in relation to each other.

As mentioned, time compression is achieved by delaying a part of the speech signals. Such delay can reduce voice intelligibility if it becomes too great. The speech delay will be a certain part of the time interval T, an upper limit thus being set for the length of time interval which may be selected. An interval time of a maximum of 1.00 ms is considered suitable.

When speech signals are to be sent in the described manner on the radio, in about half the time they took to be generated, the signal which is to be transmitted on the radio channel will have twice as high a frequency as the speech signal. The radio channel can involve limitations so that signals with twice the speech frequency are attenuated and so that when the signal is converted back to normal speed in the receiver the highest frequencies will be lacking, and there is the risk that voice quality will deteriorate.

In equipment in accordance with the invention, the time compression and time expansion means 42, 52, 43, 53 are arranged with adjustable degrees of compression and expansion, these means cooperating with associated transmitter-receiver switches 41, 51 during the adjustment. Each transmitter-receiver switch is adapted such that when its associated radio transmitter lacks a speech signal for transmission, the switch assigns the major portion of its sending time of the interval T to the other transmitter of the coacting units. The time compression means at this other transmitter is simultaneously caused to change its degree of compression so that the assigned transmission time will be filled by speech signals. With the adjustable degree of compression there is avoided a large part of the reduction in quality which could accompany time compression.

Two degrees of compression are alternated between in the exemplified equipment, one of 2.5:1 and another 5:4. A small portion of the transmission time in each time interval is required for sending synchronization signals and signals concerning the change of compression degree.

Figure 8:
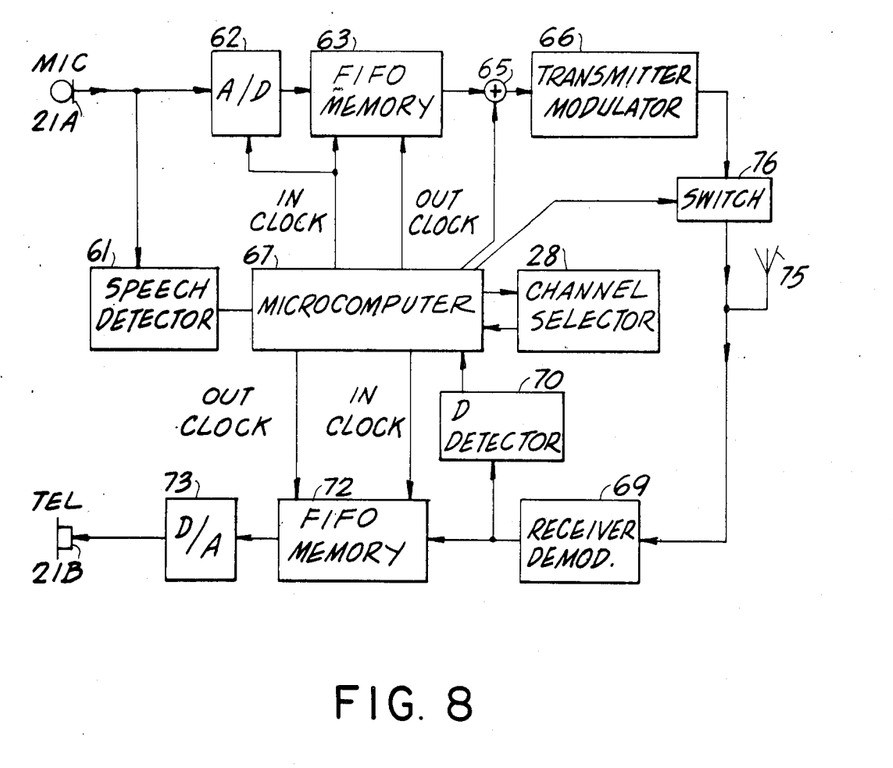
FIG. 8 illustrates a micro-computer for controlling the degree of timecompression and time expansion.

As illustrated in FIG. 8 the degree of time compression and time expansion is controlled by a microcomputer 67 in each of the stationary and portable units. In for instance the portable wireless unit 3 speech signals from the microphone 21A are sensed in a detector 61, the signal of which is stored in the microcomputer 67. The speech signals from the microphone are converted to digital signals in an analogue-digital-converter (A/D converter) 62. The digital signals are stored in a memory 63 of "first in first out" (FIFO) type. The timing of the A/D conversion and the input into the memory 63 is controlled from the microcomputer 67 with a clock signal called IN CLOCK. This clock signal is variable in frequency as will be discussed below. The output from the memory 63 is also controlled from the microcomputer 67 with a clock signal called OUT CLOCK, the frequency of which is constant.

The output from the memory 63 is divided into blocks with time intervals, and in the adder 65 there is added a syncronizing block, generated in the microcomputer 67.

The digital signals are modulated in the radio transmitter in the modulator 66 and fed to the antenna 75 via a transmission control switch 76, which is controlled from the microcomputer 67.

A receiver demodulator 69 is connected to the antenna 75 in order to demodulate radio signals received from the stationary unit. A detector 70 is arranged to detect syncronization signals among the signals received.

The demodulated signals are stored in a second FIFO-memory 72 and the signals output from the memory are converted to analogue signals in a D/A converter and fed to the telephone 21B. The input signals to the memory 72 is controlled from the microcomputer 67 with a clock signal of constant frequency called IN CLOCK and the output from the memory is controlled from the microcomputer with a clock signal called OUT CLOCK, the frequency of which is variable. The description based on FIG. 8 is applicable also on the stationary unit 1.

Figure 9:
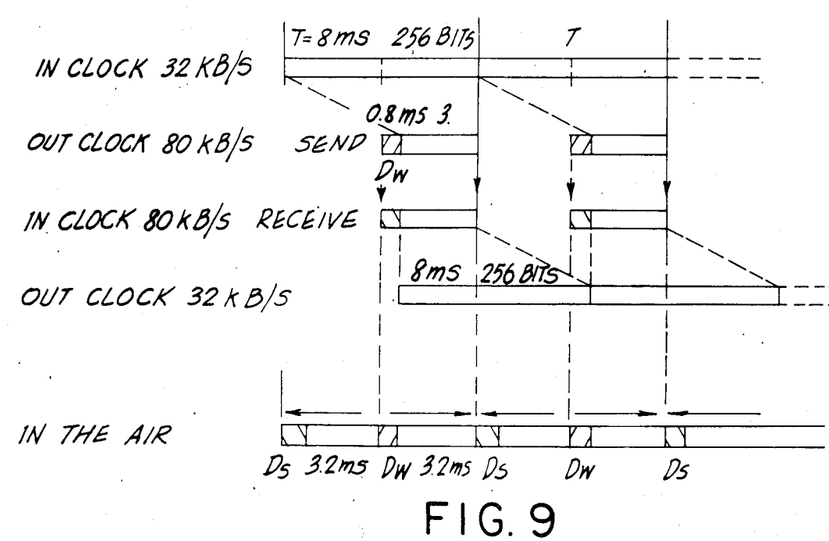
FIGS. 9, 10, 11 are detailed time-charts of the time compression and time expansion.

The time chart in FIG. 9 illustrates in detail the time compression and time expansion in a mode when speech signals are detected both at the wireless unit and at the stationary unit, the time chart being applicable in both. The speech signals are divided into time intervals with the length of 8 mS (milliseconds). In this mode the read-in frequency at the FIFO memory 63 is 32 kB/S (kilobits per second). Since a signal has been received in the detector 70 together with the syncronizing signal showing that speech signals are received from the stationary unit. Thus 256 bits are stored in the memory 63 during the time interval. Under control from the OUT CLOCK-signal from the microcomputer 67 the stored signals are read out from the memory 63, with a bit-rate of 80 kB/S so that the 256 bit are read out in 3.2 mS in the adder 65. A syncronizing block, called Dw, with a duration of 0.8 mS is added. The syncronization block contains also information on whether the speech detector 61 has detected speech signals or not.

The signals are sent by radio and received in the receiver of the stationary unit where they are stored in its corresponding FIFO-memory 72 with a bit rate of 80 kB/S. The signals in the memory 72 are read out under the control of the OUT CLOCK-singals, with a bit rate of 32 kB/S which is the same bit rate as at the A/D-converter 62 of the wireless unit.

It is obvious that the radio channel is occupied with transmission from the wireless unit only half of the time interval T, during the other half of the time interval the same radio channel is used for transmission from the stationary unit.

Figure 10:
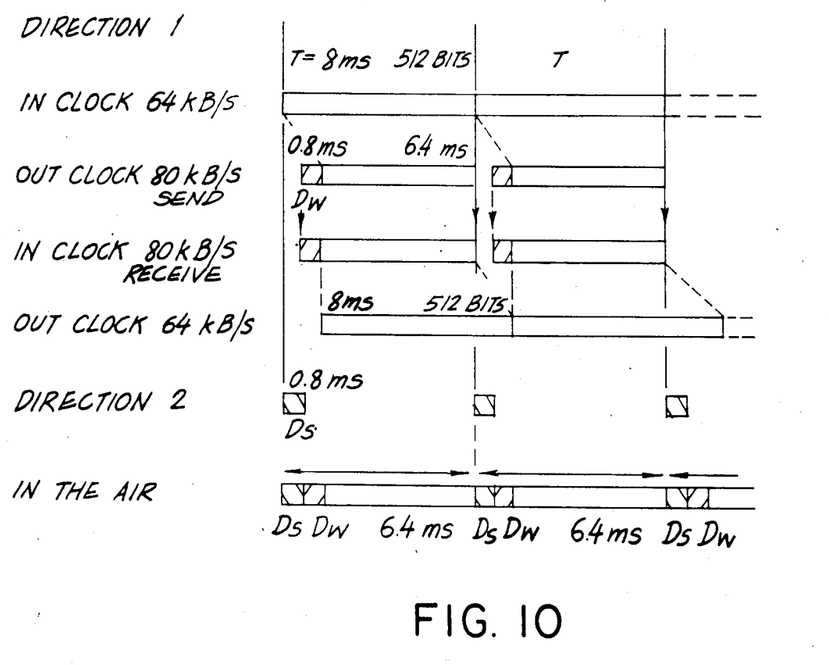

In an other mode of transmission where the wireless unit receives signals showing that no speech signals are detected at the stationary unit. The time chart in FIG. 10 is applicable. For transmission in direction 1, from the wireless unit, the signal IN CLOCK to the A/D-converter 62 and to the memory 63 is set at a higher bit rate than before, that is 64 kB/S. Thus 512 bits are stored during the time interval of 8 mS. The output from the memeory is as always at a bit rate of 80 kB/S, thus the 512 bits are read and transmitted in 6.4 mS. The syncronizing block is added to these signals.

Figure 11:
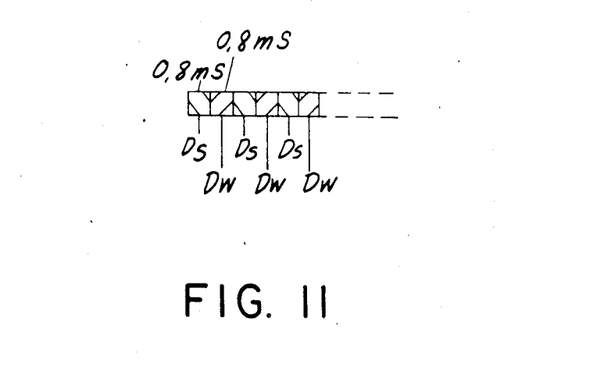

The signals received at the stationary unit are stored in the memory 72 with a bit rate of 80 kB/S as always and are in this case read out with a bit rate of 64 kB/S, the same as the input at the wireless unit. Of the time interval 0.8 mS is left for sending in the direction from the stationary unit of the signal called $D_S$ showing that no speech signals are detected at the stationary unit. A corresponding description is applicable if speech signals are detected only at the stationary unit and not at the wireless unit. If no speech signals are detected in any of the units, the two units alternate to send signals showing that no speech signals are detected, as illustrated in FIG. 11.

Figure 12:
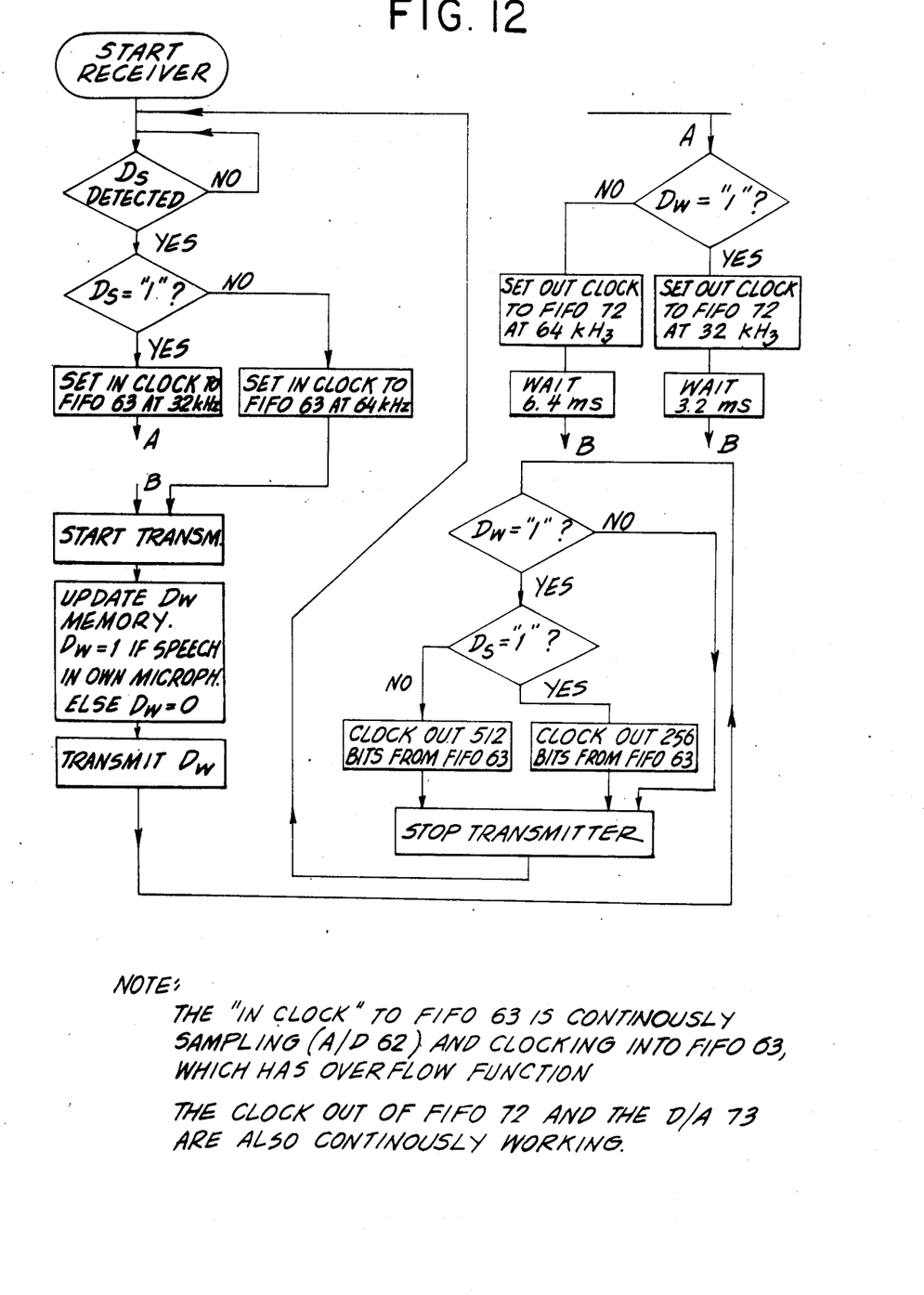
FIG. 12 is a flow-chart diagram of the time compression.

The control of the time compression and time expansion is further described in the flow-chart diagram in FIG. 12. In the diagram the signal IN CLOCK to the memory 63 and the signal OUT CLOCK to the memory 72 are continous, nonsyncronized functions. For shortness D="1" means: speech follows and D="0" means: no speech. Between the units 1, 3 the speech signals are sent by radio as digital signals modulated on a carrier wave. In an alternative equipment in accordance with the invention the radio transmitters 11, 24 are further provided with a digital-to-analogue converter inserted between the memory 63 and the adder 65 for converting the signals to analogue after time compression. The radio transmission is thus modulated with analogue signals. In this case, the radio receivers 12, 25 are each provided with an analogue-to-digital converter inserted between the modulator 69 and the memory 72 for converting received analogue signals before time expansion. In this case, analogue, time-compressed speech signals are sent by radio; they do not contain such high frequencies as digital signals and will not suffer limitations in the radio channel bandwidth to such a high degree as the digital signals. The quality of the voice transmission will thus be improved, if the bandwidth is limited. The time interval T can with advantage be made shorter for digital transmission than what is suitable for analog transmission.

In further development of the equipment in accordance with the invention, the radio receivers 12, 25 are adapted to work according to the homodyne principle. Receivers of such implementation are described in the British Patent GB-C-1530602, and are therefore not described more closely here. The carrier frequency of each radio transmitter 11, 24 in the equipment is equal to the frequency of a local oscillator in the radio receiver included in the equipment. As mentioned, a signal radio call channel for transmission in both directions is used for a pair of the units.

Both the units 1, 3 in a pair are disposed for sending the receiving calls coded for the intended receiver. On delivery, the stationary unit 1 is set for sending and receiving calls containing a given code, while the wireless handset 3 lacks such setting. Both units are provided with connection means and adapted such that, when they are connected to each other for a short while, the setting of send and receive code which is to be used by the wireless unit is transferred from the stationary unit to the latter, where it is stored.

With this arrangement there is achieved that the setting of the wireless telephone handsets to a given code before delivery becomes unnecessary, so that administrative problems in conjunction with their delivery are considerably reduced.

What is claimed is:

1. In a telephone communication system including at least a first unit and a second unit for audio information wherein each of the units includes a radio transmitter and a radio receiver, the method of radio communicating audio information between the units comprising the steps of dividing telephone audio information communication time into a plurality of equal time slots, dividing each time slot into a first and second period, during each first period radio transmitting from one of said units over a radio channel having a given range of frequencies to the other of said units and during each second period radio transmitting from said other unit to said one unit over said radio channel, the duration of said periods with respect to each other being a function of which transmitter is active at a given time.

2. The method of claim 1 further comprising the step of storing any audio information received by the first unit from other than the second unit, during a second period for transmission and during the first period occurring thereafter and the step of storing any audio information received by the second unit from other than the first unit during a first time period related thereto for transmission during the next period occurring thereafter.

3. The method of claim 1 wherein the transmission of audio information by the first unit is at greater than real time speed and the information stored by the first unit is first transmitted during said first period followed by the transmission of the said audio information being received during said first period and the transmission of audio information by the second unit is at greater than real time speed and the information stored by the second unit is first transmitted during said second period followed by the transmission of the said audio information being received during said second period.

4. The method of claim 3 wherein the radio receivers are of the homodyne type operating with a given frequency and said transmission steps comprise modulating a carrier signal having a carrier frequency in said given range of frequencies.

5. In a system including at least a base unit connected to a telephone system for interchanging telephone audio information and a mobile unit for interchanging telephone audio information wherein each of the units includes a radio transmitter and a radio receiver, the method of radio communicating telephone audio information between the units comprising steps of dividing the telephone audio information communication time into a plurality of equal time slots, dividing each time slot into a first and second period, during each first period radio transmitting over a radio channel having a given range of frequencies from the base unit any telephone audio information being received from the telephone system during the time slot associated with said first period and during each second period radio transmitting from the mobile unit any telephone audio information being received from the user during the time slot associated with said second time period, the duration of said periods with respect to each other being a function of which transmitter is active at the time.

6. Apparatus for connecting a telephone user to a telephone system comprising a base unit connected to the telephone system and a mobile unit carried by the user; said base unit comprising an antenna means, a time-controlled send-receive switch means a radio transmitter means including time compression means connected between said switch means and said antenna means for transmitting audio telecommunications information from the telephone system to the mobile unit at higher than real time speed, and a radio receiver including time expansion means connected between said antenna means and said send-receive switch means for forwarding to the telephone system via said send-receive switch means at real time speed audio telecommunication information received from the mobile unit at higher than real time speed, said mobile unit comprising an antenna means, a time-controlled send-receive switch means, means for connecting said switch means to the user, a radio transmitter means including time compression means connected between said switch means and said antenna means for transmitting audio telecommunication information from the user to the base unit at higher than real time speed, and a radio receiver means including time expansion means connected between said antenna means and said send-receive switch means for forwarding to said user via said send-receive switch means at real time speed audio telecommunications information received from the base unit at higher than real time speed, and said switch means being synchronized to operate such that only one of the two radio transmitters is transmitting at any given time, said send-receive switch means including control means for controlling the duration of send and receive modes and degree of time compression perfomed by said time compression means as a function of the presence or absence of audio telecommunication information for transmission.

7. The apparatus of claim 6 wherein the audio telecommunication information is in the form of analog signals and said compression means comprises, in serially connection, an analog-to-digital converter, a digital time compressor and a digital-to-analog converter.

* * * * *